(12) United States Patent
Harris et al.

(10) Patent No.: US 6,168,803 B1
(45) Date of Patent: Jan. 2, 2001

(54) PROCESS FOR PREPARING RIGID ANIMAL FEEDBLOCKS

(75) Inventors: Joseph M. Harris, League City, TX (US); Kenneth Eng, Jr., Winston, NM (US)

(73) Assignee: Westway Trading Corporation, New Orleans, LA (US)

( * ) Notice: Under 35 U.S.C. 154(b), the term of this patent shall be extended for 0 days.

(21) Appl. No.: 08/323,215

(22) Filed: Oct. 14, 1994

Related U.S. Application Data

(63) Continuation-in-part of application No. 08/136,014, filed on Oct. 14, 1993, now abandoned.

(51) Int. Cl.⁷ ...................................................... A61K 9/00
(52) U.S. Cl. ............................ 424/442; 424/438; 424/400
(58) Field of Search .................................. 424/76.3, 601, 424/692, 693, 438, 442; 426/2, 69, 74, 623, 630, 635, 807

(56) References Cited

U.S. PATENT DOCUMENTS

| | | | |
|---|---|---|---|
| 2,924,522 | 2/1960 | Gehrt et al. | 426/649 |
| 3,246,336 | 4/1966 | Baribo et al. | 426/2 |
| 3,476,565 | 11/1969 | Anderson et al. | 426/72 |
| 3,532,503 | 10/1970 | Kviesitis | 426/546 |
| 3,961,081 | 6/1976 | McKenzie | 426/658 |
| 4,005,192 | 1/1977 | Graham et al. | 424/692 |
| 4,027,043 | 5/1977 | Schroeder et al. | 426/69 |
| 4,062,988 | 12/1977 | De Santis | 426/656 |
| 4,160,041 | 7/1979 | Schroeder et al. | 426/69 |
| 4,171,386 | 10/1979 | Skoch et al. | 426/658 |
| 4,234,608 | 11/1980 | Linehan | 426/72 |
| 4,265,916 | 5/1981 | Skoch et al. | 426/74 |
| 4,393,082 | 7/1983 | White et al. | 426/2 |
| 4,431,675 | 2/1984 | Schroeder et al. | 426/69 |
| 4,515,780 | 5/1985 | Laurent et al. | 424/684 |
| 4,631,192 | 12/1986 | Mommer et al. | 426/69 |
| 4,759,932 | 7/1988 | Laurent et al. | 426/2 |
| 4,851,244 | 7/1989 | Theuninck et al. | 426/74 |
| 4,994,282 | 2/1991 | Miller | 426/74 |
| 5,140,949 | 8/1992 | Chu et al. | 426/2 |
| 5,236,717 | 8/1993 | Vinci | 426/2 |
| 5,260,089 | 11/1993 | Thornberg | 426/624 |
| 5,264,227 | * 11/1993 | Laroche et al. | 426/2 |

* cited by examiner

*Primary Examiner*—Thurman K. Page
(74) *Attorney, Agent, or Firm*—Crutsinger & Booth

(57) ABSTRACT

A process for preparing animal fee blocks requiring minimum physical compression which consists of adding an aqueous feed mixture to dry or semi-moist nutritive ingredients and at least one alkaline earth metal oxide. The resulting non-pourable and non-pumpable mixture is then transferred to a receiver, such as a mold, and subjected to compression.

21 Claims, No Drawings

PROCESS FOR PREPARING RIGID ANIMAL FEEDBLOCKS

CROSS-REFERENCE TO RELATED APPLICATION

This application is a continuation-in-part application of U.S. patent application Ser. No. 08/136,014, filed Oct. 14, 1993 now abandoned.

BACKGROUND OF THE INVENTION

1. Field of the Invention

This invention relates to a process of preparing rigid feedblocks of animal feed supplements. Such feedblocks supplement the daily diet of animals with scarce nutrients and/or vitamins or medicaments required by the animal.

Feedblocks produced by the process of this invention have a lower moisture content than the feedblocks of the prior art. In addition, the process of this invention permits the incorporation of a greater percentage of dry components and a smaller percentage of alkaline earth oxides into the feedblock. As a result, feedblocks produced by the process of this invention are less expensive than feedblocks made by the processes of the prior art.

2. Description of the Prior Art

Dietary supplements, in the form of solid feedblocks, have been recognized for many years as a vehicle to provide energy, protein, minerals, and vitamins to livestock. The use of such supplements is often attributed to the fact that pastures are deficient in such materials. In addition, solid feedblocks also are used to provide certain medicaments to animals.

The market for feedblocks designed to supplement protein and energy to livestock started to evolve during the mid 1960's. Typical formulations consisted of dried molasses, urea, oil seed meal, minerals, and vitamins. Such products were well accepted by small hobby cattlemen since they did not require a feeder or other equipment. In addition, daily supplementation was not required.

During the mid 1970's, chemical processes of preparing such dietary feedblocks started to proliferate. Blocks of up to 500 lb. weight could be produced from such processes. To date, all of the processes of the prior art involve a step of solidifying liquid products. In particular, such processes require a step of pouring liquid materials into molds and then subjecting the "poured-blocks" to a curing mechanism.

Generally, methods of manufacturing animal feedblocks can be divided into two basic categories. The first involves the production of feedblocks from extreme physical compression of materials. Exemplary of such processes are those described in U.S. Pat. Nos. 3,532,503, 3,500,795, 3,476,565, 3,246,366, and 2,924,522. Such processes are limited since they are unsuitable for the production of large size feedblocks. The maximum size feedblock which can be obtained by use of such processes is about 33.33 lbs. In addition, these processes exhibit low inclusion rates for nutritive liquids.

The second category is drawn to blocks formed by the reaction of metal oxides, such as calcium and magnesium oxide, and water bearing nutrient media, such as molasses, and a variety of other agents. Included within this second category are (1) reactions between sugar solutions, soluble phosphorus sources and metal alkalis, such as those disclosed in U.S. Pat. Nos. 4,027,043, 4,160,041, 4,221,818, and 4,431,675;

(2) formation of blocks by mixing under shearing conditions molasses, water, water absorbent clays, magnesium oxide, a water soluble phosphorus source, and animal fat (and optionally a ferrous sulfate). See, for instance, U.S. Pat. Nos. 4,016,296, 4,171,385, 4,171,386 and 4,265,916;

(3) formation of a semi-rigid form containing heated molasses, magnesium oxide and dicalcium phosphate. Such formations are disclosed in U.S. Pat. Nos. 4,005,192 and 4,234,608;

(4) use of condensed vegetable solubles, such as a nutritive binder, corn steep liquor concentrate, vegetable seed meal, and salt. See, for instance, U.S. Pat. No. 4,349,578; and (5) molasses based formulae comprising molasses, a trivalent salt of iron, aluminum or chromium, and magnesium oxide as the setting agent. Such formulae are disclosed in U.S. Pat. No. 4,851,244.

The processes of the second category all share a common drawback—they require a step of solidifying liquid products. As a result, it is not possible to use dry ingredients at maximum levels.

SUMMARY OF THE INVENTION

The invention is drawn to an economical process of preparing animal feedblocks and requires minimal physical compression. The process consists of adding an aqueous feed mixture containing an edible source of either sulfur or phosphorus to solid components comprising dry or semi-moist nutritive ingredients and at least one alkaline earth metal oxide. The resulting uniform mixture is an amorphous mass which is non-pumpable and non-flowable, but yet is formable. The mixture has the consistency of a paste. The mixture is transferred to a mold and subjected to compression prior to a relatively short curing stage. The resulting hardened feedblock contains less moisture than the feedblocks of the prior art.

DESCRIPTION OF THE PREFERRED EMBODIMENTS

The invention is drawn to a process for preparing rigid animal feedblocks for use as dietary feed supplements. The process is particularly useful for the production of feedblocks for ruminant livestock. The process does not require the formation of a "pourable mixture" and thus avoids the need to pump the material mix prior to block formation. Since the process does not require the composite to be pumpable, lower levels of alkaline earth metal oxides (the more expensive chemical reactants of feedblocks) may be employed. As such, the process of this invention minimizes inclusion rates of alkaline earth oxides.

Further, the process provides for the use of zeolite as a nutritional and hardening agent. In addition, zeolite serves to regulate the release of nitrogen from non-protein sources in ruminant feeding and from animal excrement. Further, it reduces the odor and loss of ammonia which occurs during manufacturing as well as rumen sulfide and sulfate levels.

The process consists of the following five steps:

Step (a)—mixing liquid nutritive component(s) and a water soluble and edible source of either sulfur or phosphorus to render a sulfate or phosphate nutritive aqueous feed mixture;

Step (b)—mixing the aqueous feed mixture with dry to semi-moist nutritive ingredients and at least one alkaline earth metal oxide until a substantially uniform mixture is obtained;

Step (c)—transferring the substantially uniform mixture into a receiver;

Step (d)—expelling air entrained in the mixture by compression; and

Step (e)—curing the compressed feedblock.

The process requires only moderate physical compression over a short period after transfer of the substantially uniform mixture to the receiver. Typically, the pressure applied should be between about 60 and about 150 pounds per square inch of surface area for one to ten seconds.

Feedblocks made by the process of this invention characteristically exhibit a lower moisture content than commercially available feedblocks. The moisture content of the feedblock can be readily determined by following equation (I):

$$\frac{\text{wt of feedstock before drying} - \text{wt. of feedstock after drying}}{\text{wt. of feedstock before drying}} \quad (I)$$

In addition, the process of this invention permits the formation of feedblocks from components having a summation moisture index of between about 17 to about 22 weight percent. Summation moisture index is defined as the sum of the "products" of the moisture indices of each of the components of the animal feedblock prior to curing times the percentage inclusion rate. It is normally obtained by totaling the moisture indices of each of the components prior to the start of the initial step of the process. The summation moisture index of commercially available feedblocks is typically between about 25 to about 30 weight percent. The moisture index for each of the components of the feedblock may be determined in accordance with methods 934.01, 930.15 or 966.20, as published by the Association of Official Analytical Chemist.

In addition, the moisture content of the feedblock made by the process of this invention is less than the summation moisture index. The differences in the moisture content of the feedblock versus the summation moisture index is attributed to the hydration of the alkaline earth oxide(s) during the curing stage.

In the initial step of the process, an "aqueous feed mixture" is obtained by mixing together the liquid nutritive component(s) with an edible source of either sulfur or phosphorous, optionally with other water soluble components, such as salt, urea, biuret, ammonium sulfate, etc. Mixing is continued until the resulting nutritive aqueous feed mixture has the consistency of a thick milkshake or pourable syrup. Typically, the aqueous feed mixture has a viscosity of about 400 to about 40,000 cps, 25° C. and is pumpable. Such admixing is highly exothermic.

Fats may also be mixed in the initial step with the liquid nutritive components and the edible sources of either sulfur or phosphorous. Typically, the fat component does not dissolve in the liquid media of the feed mixture. When present, the total amount of fats in the feedblock can be between about 0.5 to about 20.0 weight percent. The fats include various fatty acids, such as stearic, palmitic, oleic, linoleic, and lauric, and the mono, di, or triglycerides of these fatty acids. Useful fats and oils can also include lipids, such as phospholipids, for example, fatty acid esters of glycerol, phosphate or lecithins, which also contain nitrogen bases, such as choline. The fats are commonly identified by source and suitable fats which can be employed include the oils, tailings or refining residues from the following sources: soybean oil, cottonseed oil, sesame oil, rapeseed oil, olive oil, corn oil, tallow, fish oil, coconut oil and palm oil. Preferably, relatively inexpensive sources of fats are employed, such as yellow grease compositions, restaurant fats and greases, acidulated soap stocks or acidulated fats and oils. Vegetable oil, lard, animal tallow, and grease are especially preferred.

The liquid nutritive component(s) for use in this invention can be any number of commonly available feed ingredients which are either liquid in nature or soluble in water. Most are co-products of the food-processing, fermentation and lumber industries. These include but are not limited to molasses products and lignin sulfonate, condensed fermented corn extractives (steep liquor), and condensed whey. Included within the term molasses products are wood molasses, beet molasses (including beet molasses, dried product and dried beet pulp molasses), cane molasses, citrus molasses, molasses yeast condensed solubles, condensed molasses fermentation solubles, starch molasses, molasses distillers condensed solubles and molasses distillers dried solubles. Particularly preferred as molasses products are cane molasses, beet molasses, wood molasses and condensed molasses fermentation solubles.

A water soluble nutritive component, like a nonprotein nitrogen source, such as ammonia, urea or biuret, may be admixed with the liquid nutritive component(s) to supply a part of the nitrogen dietary requirements for ruminants.

No particular specification is imposed upon any of the above materials other than that they be suitable for feed usage. Typically, the feedblock produced by the process of this invention contains from about 15 to about 55 percent by weight (based on the total weight of the feedblock) of the liquid nutritive components.

Water soluble edible sources of sulfur and phosphorus are further widely utilized in the feed industry. In feedblocks prepared by the process of this invention, between about 1.5 to about 6.0 percent by weight of the feedblock contains an edible source of either phosphorus or sulfur. Most preferably, the amount of elemental phosphorus or elemental sulfur in the resulting feedblock is between about 0.6 to about 1.25 percent by weight. Preferably, a phosphorus source is used versus a sulfur source since the livestock's need for supplemental sulfur is less than that of phosphorus.

The phosphorus source is commonly selected from phosphoric acid, ammonium polyphosphate as well as monosodium phosphate. If for nutritional purposes a higher level of phosphorus is desired, it may be derived from any of the above sources or other commonly used feed grade source including, but not limited to, mono-, di- or tri-phosphate of an alkaline earth metal, such as calcium. Sources of soluble sulfur may include sulfuric acid, sodium sulfate, and ammonium sulfate. Inclusion in the invention of either a sulfur or phosphorus is necessary until a concentration of elemental phosphorus or sulfur derived from one or a combination of these sources is achieved.

In the second step of the process of this invention, the aqueous feed mixture is added to the dry to semi-moist nutritive ingredients and at least one alkaline earth oxide. The weight percent, based on total weight of the resulting feedblock produced by the process of this invention, of dry to semi-moist nutritive ingredients is generally between from about 25 to about 60 percent.

Preferably, the aqueous feed is added to a pre-blend of the dry to semi-moist nutritive ingredients and alkaline earth oxide. The pre-blend is prepared by mixing the components together using a conventional feed mixing apparatus. The warm aqueous feed mixture is added to the resulting pre-blend. A semi-moist cohesive amorphous mass is formed. This mass is non-pumpable as well as non-flowable and exhibits a pasty consistency which resembles unbaked cookie dough. As such, the mass can easily be formed to the contours, if any, of the receiver.

The dry to semi-moist materials may comprise any ingredient having nutritional or medicinal value to livestock. These include animal protein products, forage products, grain products, plant protein products, process grain by-products and roughage products. Exemplary of animal protein products are dried animal blood, animal by-product meal, condensed buttermilk, dried buttermilk, casein, dried hydrolyzed casein, cheese rind, crab meal, fish by-product, fish liver and glandular meal, fish meal, meat meal tankage, dried meal solubles, dried milk albumin, dried whole milk, dried mild protein, poultry by-products, poultry by-product meal, poultry hatchery by-product, shrimp meal, condensed skim milk, condensed cultured skimmed milk, fish protein concentrate, fish residue meal, condensed fish solubles, dried fish solubles, fleshings hydrolysate, hydrolyzed hair, hydrolyzed feather meal, hydrolyzed poultry by-product aggregate, hydrolyzed poultry feathers, meat and bone meal, meat and bone meal tankage, meat meal, dried skim milk, dried cultured skimmed milk, condensed whey, condensed cultured whey, condensed hydrolyzed whey, dried whey, dried hydrolyzed whey, condensed whey-product, dried whey-product, condensed whey solubles and dried whey solubles. Exemplary of the forage products are alfalfa leaf meal, dehydrated alfalfa meal, ground alfalfa hay, suncured alfalfa meal, coastal bermuda grass hay, dehydrated corn plant, dehydrated silage (ensilage pellets), flax plant product, ground grass, lespedeza meal, lespedeza stem meal and ground soybean hay. Exemplary of the grain products are barley, corn, corn feed meal, grain sorghums, mixed feed oats, oats, wheat, rice (ground brown, ground paddy, ground rough, broken or chipped), brewers rice, rye and triticale. Such grain products may be whole, ground, cracked, screen cracked, flaked, kibbled, toasted or heat processed. Exemplary of the plant protein products are algae meal, beans, canola meal, coconut meal, cottonseed flakes, cottonseed cake, cottonseed meal, low gossypol cottonseed meal, whole pressed cottonseed, guar meal, linseed meal, peanut meal, peas, rapeseed meal, safflower meal, soy protein concentrate, soybean feed, ground soybeans, soybean meal, kibbled soybean meal, heat processed soybeans, soy flour, soy grits, sunflower meal, dehulled sunflower meal, active dry yeast, brewers yeast, culture yeast, dried yeast, grain distillers dried yeast, molasses distillers dried yeast, primary dried yeast and torula dried yeast. Exemplary of the processed grain by-products are aspirated grain fractions, brewers dried grains, buckwheat middlings, malt sprouts, oat groats, feeding oat meal, soluble condensed distillers, condensed fermented corn, extractives with germ meal bran, corn bran, corn flour, corn germ meal (wet and dry milled), corn gluten feed, corn gluten meal, corn grits (distillers dried grains, distillers dried grains/solubles, as well as distillers dried solubles), flour, grain sorghum germ cake, grain sorghum germ meal, grain sorghum grits, grain sorghum mill feed, pearl barley by-products, peanut skins, rice bran, rice polishings, rye middlings, gelatinized sorghum grain flour, partially aspirated gelantinized sorghum grain flour, wheat bran, wheat feed flour, wheat shorts, wheat germ meal, defatted wheat germ meal, wheat middlings, wheat mill run, wheat red dog and hominy feed. Exemplary of roughage products are ground almond hulls, dried apple pectin pulp, dried apple pomace, bagassee, barley hulls, barley mill by-product, dried beet pulp, buckwheat hulls, dried citrus meal, dried citrus pulp, citrus seed meal, corn cob fractions, corn plant pulp, cottonseed hulls, flax straw by-products, husks, malt hulls, clipped oat mill by-product, oat hulls, oat mill by-product, peanut hulls, rice hulls, rice mill by-product, rye mill run, soybean hulls, soybean mill feed, soybean mill run, sunflower hull, ground straw and dried tomato pomace. Particularly preferred further are corn gluten meal, corn bran, milk processing by-products, feather meal, and other animal by products, oil seed products, and dehydrated animal waste approved for ruminant feeding. Included in the latter group are poultry or swine waste.

Nonprotein nitrogen sources may further be added as a dry to semi-moist material. These include ammonia, urea, biuret and ammonium sulfate.

Various trace nutrients, drugs, and vitamins may also be incorporated with the dry to semi-moist materials. These include vitamins A, D and E, tocopherols as well as those medicaments in accordance with FDA regulations.

The second step of the process of this invention may also include the presence of zeolite in the dry to semi-moist nutritive ingredients. Preferably, between from about 0.5 to about 15 percent by weight of the total feedblock consists of zeolite. Preferably, the zeolite is part of the pre-blend to which is added the aqueous feed mixture. Zeolite, when fed to livestock, is capable of modulating both the uptake of ammonia into the blood stream of the animal as well as the release of ammonia to the environment. When combined with feedstuffs containing a high level of non-protein nitrogen, such as urea and poultry waste, zeolite is capable of lowering ammonia and blood urea nitrogen levels. In addition, the ability of ruminant livestock to accept feeds containing free ammonia is improved when the feedblock includes zeolite. It further reduces the odor in excrement of animals. Zeolite can also be utilized to interact with rumina sulfide and sulfate. Excess rumen sulfide and sulfate levels have been associated with the inhibition of active thiamine synthesis by rumen microorganisms.

The process of this invention further produces improved feedblocks at lower costs than those commercially available since it permits the incorporation of a greater percentage of dry components and a smaller percentage of alkaline earth oxides than feedblocks of the prior art. Particularly preferred oxides are magnesium oxide, calcium oxide and a combination thereof.

From about 2.0 to about 10.0 percent by weight of the total weight of the feedblock produced by the process of this invention typically consists of alkaline earth oxides. Where a mixture of oxides exist the weight ratios of the oxides in the resulting feedblock may be between 5:95 to 95:5. Particularly good results are obtained using between about 1.50% to about 6.0 percent by weight magnesium oxide and between from about 1.5 to about 3.0 percent by weight of calcium oxide.

The magnesium oxide used in the invention is preferably of a grade and particle size of those oxides commonly used in chemical processing industries. Preferably, the magnesium oxide is at least 93% pure and is produced by the calcination of natural magnesite. The magnesium oxide further may be derived by sea water extraction. Since particle size affects the rate of hydration, it is often critical. Preferably, the particle size of the magnesium oxide is less than 300 mesh. Most preferably, the particle size area of at least 85% by weight of the magnesium oxide is capable of passing through a 300 mesh screen.

The particle size of the calcium oxide (often commercially described as lime or quick lime) further is preferably finely subdivided. The particle size of at least 90% by weight of the oxide is less than 100 mesh. Most preferably, the particle size of at least 90% by weight of the calcium oxide is capable of passing through a 100 mesh screen. The calcium oxide should ideally also be of high purity. Particularly good results may be obtained where the purity level of calcium oxide is greater than or equal to 95%.

Water sorbant clay of the bentonite and attapulgite type may be added to the dry to semi-moist nutritive ingredients and alkaline earth metal oxide in order to increase the rate of curing of the feedblock or attenuate the hardness of the resulting feedblock. (The aqueous feed mixture is added to the resulting admixture.) As a result, less of the alkaline earth metal oxides needs to be used. Generally, up to about 5.0%, most preferably between about 0.5 to about 5.0%, by weight of the feedblock may be water sorbative clay. Such materials are commonly used in the feed industry as pelleting and suspending agents in various feed forms.

Prior to the addition of the aqueous feed mixture to the dry to semi-moist nutritive ingredients, alkaline oxide(s) and (optionally) clay and zeolite, the aqueous feed mixture may be heated to a temperature between from about 80° to about 130° F., preferably between from about 90° F. to about 110° F. However, due to the exothermic nature of the mixing of components in step (a), this additional heating step may be unnecessary. This additional heating step initiates the hydration reaction with the alkaline earth oxide(s). In addition, it serves to regulate the rate of the curing process which occurs in the last step of the process.

In the third step [following the mixing of the heated aqueous feed with the dry to semi-moist nutritive ingredients, alkaline oxide(s) and (optionally) clay and zeolite], the resulting mixture being a semi-moist cohesive mass and having the consistency of unbaked cookie dough is dispensed to a receiver which may be a mold or reinforced package, such as the packaging material for shipment of the feedblock. The mixture is preferably openly conveyed to the receiver. In the receiver, the mixture is subjected to physical compression. Air entrained within the mixture is expelled by the compression. The resulting product is a compacted mass which contains practically no air pockets. Typically, the pressure applied to the mixture is between about 60 to about 150 psi. Normally, such pressures need not exceed a time period of from 1 to about 10 seconds.

In the final step of the process, the compressed mixture is allowed to remain substantially undisturbed for period of 1 to 12 hours in order to complete the curing process. Curing, which occurs at room temperature, results from the hydration reaction with the alkaline earth metal oxide(s). Time, pressure, and component composition can all be varied to control hardness as a means of consumption regulation. For instance, in the production of a 250 lb. feedblock, the substantially uniform mixture, heated to about 90° F., is transferred into the receiver and compressed. Within two minutes, the initial internal temperature within the product is between about 110° and about 115° F. The temperature shortly reaches between 125 to about 140° F. Curing is complete when the internal temperature returns to be between 90° and 110° F.

The following examples are illustrative of the invention and do not in any way limit or define the scope of the invention.

EXAMPLES

The following components were used in the Examples to make the aqueous feed mixture: cane molasses, corn steep liquor, fat product (vegetable oil), urea, phosphoric acid, salt and water. These components are either liquid or soluble in water.

Examples 1–10

The aqueous feed components were weighed, as set forth in the charts below, and mixed together. They were then heated to approximately 90° F. The remaining components, being non-soluble, were then weighed into a mixing vessel and mixed together. The aqueous feed components were then added to the non-soluble components and mixed until a homogeneous and cohesive mass was obtained. Mixing was performed using a low speed paddle apparatus for about two minutes. All percentages are weight percentages based on the total mixture of all components before curing:

| INGREDIENTS | Example | | | | |
|---|---|---|---|---|---|
| | 1 | 2 | 3 | 4 | 5 |
| | % BY WEIGHT | | | | |
| Cane Molasses | 30.0 | 30.0 | 35.0 | 30.0 | 30.0 |
| Grain Dust | 0 | 16.8 | 10.0 | 18.5 | 17.0 |
| Corn Steep Liquor | 11.5 | 11.9 | 12.2 | 16.4 | 10.0 |
| Corn Gluten Feed | 28.9 | 11.4 | 10.0 | 7.2 | 10.0 |
| Fat Product | 4.0 | 4.3 | 4.5 | 4.5 | 4.4 |
| Oil Seed Meal | 6.2 | | 5.0 | 2.5 | 4.0 |
| Urea | 4.2 | 5.2 | 5.3 | 5.5 | 5.6 |
| Salt | 2.5 | 2.5 | 2.5 | 2.5 | |
| Zeolite | 5.0 | 5.0 | 2.5 | 2.5 | 5.0 |
| MgO | 2.5 | 2.5 | 2.5 | 2.5 | 2.5 |
| CaO | 2.5 | 2.5 | 2.5 | 2.5 | 2.5 |
| Phos. Acid | 2.7 | 2.9 | 3.0 | 2.9 | 3.0 |
| Clay | | 2.5 | | | |
| Calcium Sulfate | | 2.5 | 2.5 | 2.5 | |
| Water | | | | | |
| Sunflower Screening | | | | | |
| Barley Malt Sprouts | | | | | |

| INGREDIENTS | Example | | | | |
|---|---|---|---|---|---|
| | 6 | 7 | 8 | 9 | 10 |
| | % BY WEIGHT | | | | |
| Molasses Products | 30.0 | 24.2 | 19.0 | 30.0 | 30.0 |
| Grain Dust | | 17.0 | 35.0 | | 7.5 |
| Corn Steep Liquor | 10.0 | 13.0 | 19.0 | 12.5 | 12.5 |
| Corn Gluten Feed | | 16.0 | | | |
| Fat Product | 1.0 | 4.3 | 4.6 | | |
| Oil Seed Meal | 7.9 | 2.5 | 1.0 | | |
| Urea | 5.6 | 5.2 | 6.0 | | 5.5 |
| Salt | 4.0 | 2.5 | 2.5 | 2.5 | 2.5 |
| Zeolite | 2.5 | 5.0 | 5.0 | 2.5 | 2.5 |
| MgO | 2.5 | 2.5 | 2.5 | 2.5 | 2.5 |
| CaO | 2.5 | 2.5 | 2.5 | 2.5 | 2.5 |
| Phos. Acid | 3.0 | 2.8 | 2.7 | 2.5 | 2.5 |
| Clay | 2.5 | | | | |
| Calcium Sulfate | 2.5 | 2.5 | | | |
| Water | 0.8 | | 0.2 | | |
| Sunflower Screening | 25.2 | | | 27.5 | 32.0 |
| Barley Malt Sprouts | | | | 17.5 | |

For each of the Examples, the total mass was separated into approximately two equal parts of approximately 500 grams each and were transferred onto a wax paper lined tubing of 4" diameter and was then subjected to shock compression by repeatedly striking it with a blunt heavy object several times. The sample, in the form of a puck, was wrapped and left overnight at room temperature. By next morning, the samples had fully cured.

Example 11

An animal feedblock was prepared from the components set forth in the Chart below. The summation moisture index was calculated as the sum of the moisture index of each of the components. The moisture index of the components was obtained by multiplying the weight percent by the moisture content for each of the respective components. The moisture content for each of the components, in turn, was determined in accordance with methods 966.20 (molasses and corn steep) and 930.15 (all other components), published in the 15th Edition of the Official Methods of Analysis by the Association of Official Analytical Chemist. All percentages are weight percentages:

| INGREDIENTS | % BY WEIGHT | MOISTURE CONTENT | MOISTURE INDEX (% by × moisture index) |
|---|---|---|---|
| Sunflower Screening | 26.00 | × 0.08 | = 2.080 |
| Cane Molasses | 30.00 | × 0.27 | = 8.100 |
| Steep Liquor | 10.00 | × 0.55 | = 5.500 |
| Oil Seed Meal | 7.40 | × 0.08 | = 0.592 |
| Urea | 5.60 | × 0.00 | = 0.000 |
| Zeolite | 2.50 | × 0.10 | 0.250 |
| Clay | 2.50 | × 0.10 | = 0.250 |
| Phos. Acid | 2.98 | × 0.30 | = 0.894 |
| Salt | 4.00 | × 0.03 | = 0.120 |
| MgO | 2.50 | × 0.02 | = 0.050 |
| CaO | 2.50 | × 0.02 | = 0.050 |
| Calcium Sulfate | 2.50 | × 0.10 | = 0.250 |
| Water | 1.35 | × 1.00 | = 1.350 |
| Trace Mineral Premix | 0.15 | × 0.00 | = 0.000 |
| Vitamin A-DE Premix | 0.00 | × 0.00 | = 0.000 |
| SUMMATION MOISTURE INDEX: | | | 19.49% |

The aqueous feed components were then weighed, as set forth in the chart below and mixed together. They were then heated to approximately 90° F. The remaining components, being non-soluble, were then weighed into a mixing vessel and mixed together. The aqueous feed components were then added to the non-soluble components and mixed until a homogeneous and cohesive mass was obtained. Mixing was performed using a 4 ton capacity ribbon mixer.

About 1 ton of product was obtained. The sample was divided into eight equal portions and then dispensed into 250 lb. portion paperboard containers of 20.5" diameter. These containers were then subjected to 20 ton pressure or 121.25 lbs. per square inch for 5 seconds. The composite was cured in containers under ambient temperature overnight. The moisture index of the cured feedblock was determined from Equation (1) above to be 13%. The resulting blocks were then fed to cattle in New Mexico, Texas, Oklahoma, Missouri, North Dakota, South Dakota, and Wisconsin. Animals consumed the material readily.

Examples 12–14

The formulations set forth in the chart below were subjected to the procedures set forth above for Examples 1–10 as well as the pilot production set forth in Example 11.

The moisture index was determined to be 13% for the composite cured feedblock. This was determined by in accordance with Equation (1) above.

| | Example | | |
|---|---|---|---|
| Ingredient | 12 | 13 | 14 |
| Molasses Products | 29.00 | 22.00 | 29.00 |
| Rice Bran | 12.00 | 16.50 | 17.00 |
| Corn Steep Liquor | 15.00 | 10.00 | 8.00 |

-continued

| | Example | | |
|---|---|---|---|
| Ingredient | 12 | 13 | 14 |
| Fat Product | 2.50 | 9.00 | 2.30 |
| Urea | 0.00 | 3.40 | 4.40 |
| Salt | 2.70 | 3.00 | 5.00 |
| Animal Protein Product | 9.80 | 14.50 | .25 |
| Zeolite | 1.00 | 0.00 | 0.00 |
| Magnesium Oxide | 4.00 | 3.50 | 2.50 |
| Calcium Oxide | 3.00 | 3.00 | 3.00 |
| Phosphoric Acid | 2.50 | 3.70 | 3.00 |
| Clay | 5.00 | 4.00 | 5.00 |
| Calcium Sulfate | 1.00 | 1.00 | 1.00 |
| Water | 2.50 | 3.90 | 4.80 |
| Corn Gluten Feed | 10.00 | 0.00 | 12.25 |
| Ammonium Sulfate | 0.00 | 2.50 | 2.50 |

For the production sample, the resulting blocks were fed to cattle in New Mexico, Texas, Oklahoma, Missouri, North Dakota, South Dakota, and Wisconsin. Animals consumed the material readily.

It appears from these efforts that animal feedblocks produced according to this invention are easily made, relatively inexpensive, palatable to animals and can serve as effective carriers for nutrients and medicants.

We claim:

1. A process for preparing a rigid animal feedblock comprising the steps of:
   (a) mixing liquid nutritive components, optionally with a water soluble nutritive component, with an edible source of either sulfur or phosphorus to provide a sulfate or phosphate nutritive aqueous feed mixture;
   (b) mixing the aqueous feed mixture with dry to semi-moist nutritive ingredients and at least one alkaline earth metal oxide until a substantially uniform, cohesive, non-pumpable, non-flowable mixture is obtained;
   (c) transferring the mixture to a receiver;
   (d) compressing the mixture in the receiver at a pressure and for a time sufficient until any entrained air within the mixture is expelled to provide a compressed feedblock; and
   (e) curing the compressed feedblock by allowing the compressed feedblock to remain undisturbed for a time sufficient to obtain a rigid feedblock.

2. The process of claim 1, wherein prior to step (b), the sulfate or phosphate nutritive aqueous feed mixture is heated to a temperature between about 80° F. to about 130° F.

3. The process of claim 1, wherein the alkaline earth metal oxide is selected from the group consisting of magnesium oxide or calcium oxide and mixtures thereof.

4. The process of claim 1, wherein the mixture is subjected in step (d) to a pressure in the range of about 60 to about 150 pounds per square inch.

5. The process according to claim 1, wherein the dry to semi-moist nutritive ingredients are selected from the group consisting of animal protein products, forage products, grain products, plant protein products, process grain by-products and roughage products.

6. The process of claim 4, wherein the mixture is subjected to compression in step (d) for 1 to about 10 seconds.

7. The process of claim 1, wherein the feedblock in step (e) is cured by allowing it to remain undisturbed for about 1 to about 12 hours.

8. The process according to claim 1, wherein the liquid nutritive components are selected from the group consisting of a molasses product, lignin sulfonate, steep liquor, condense whey and condensed distilled solubles and mixtures thereof.

9. The process according to claim 1, wherein the aqueous feed mixture is further mixed in step (b) to water sorbative clay.

10. The process according to claim 1, wherein the dry to semi-moist nutritive ingredients include zeolite.

11. The process according to claim 1, wherein the dry to semi-moist nutritive ingredients comprise a non-protein nitrogen source.

12. The process according to claim 11, wherein the nitrogen source is selected from the group consisting of ammonia, urea, biuret and ammonium sulfate.

13. The process according to claim 1, wherein the water soluble nutritive component is a non-protein nitrogen source.

14. The process according to claim 1, wherein the liquid nutritive component contains a water-insoluble fat.

15. The process according to claim 3, wherein the alkaline earth metal oxide consists of magnesium oxide and calcium oxide and further wherein the particle size of at least 85% of magnesium oxide is less than 300 mesh and the particle size of at least 90% of calcium oxide is less than 100 mesh.

16. The process according to claim 13, wherein the nitrogen source is selected from the group consisting of ammonia, urea, biuret and ammonium sulfate.

17. The process of claim 3, wherein the feedblock from step (e) comprises from about 15% to about 55% by weight nutritive liquids, about 1.5% to about 6% by weight edible source of either sulfur or phosphorus, about 1.50% to about 6% by weight magnesium oxide, about 1.5% to about 3% by weight calcium oxide and about 25% to about 60% by weight dry to semi-moist nutritive ingredients.

18. The process according to claim 17, wherein the feedblock further comprises between about 0.5 to about 15% by weight zeolite.

19. The process according to claim 1, wherein the moisture content of the product of step (e) is lower than the summation moisture index of the liquid nutritive components, water soluble nutritive component, source of sulfur or phosphorus, dry to semi-moist nutritive ingredients and alkaline earth metal oxide of steps (a) and (b).

20. The process according to claim 1, wherein the summation moisture index of the liquid nutritive components, water soluble nutritive component, source of sulfur or phosphorus, dry to semi-moist nutritive ingredients and alkaline earth metal oxide is between from about 17 to about 22 weight percent.

21. A process for preparing a rigid animal feedblock comprising the steps of:
   (a) mixing liquid nutritive components, optionally with a water soluble nutritive component, with an edible source of either sulfur or phosphorus to provide a sulfate or phosphate nutritive aqueous feed mixture;
   (b) mixing the aqueous feed mixture with dry to semi-moist nutritive ingredients including zeolite, and at least one alkaline earth metal oxide until a substantially uniform, cohesive, non-pumpable, non-flowable mixture is obtained;
   (c) transferring the mixture to a receiver;
   (d) compressing the mixture in the receiver at a pressure and for a time sufficient until any entrained air within the mixture is expelled to provide a compressed feedblock; and
   (e) curing the compressed feedblock by allowing the compressed feedblock to remain undisturbed for a time sufficient to obtain a rigid feedblock comprising 25 to 60 wt. % dry to semi-moist nutritive ingredients.

* * * * *

UNITED STATES PATENT AND TRADEMARK OFFICE
CERTIFICATE OF CORRECTION

PATENT NO. : 6,168,803 B1  
DATED : January 2, 2001  
INVENTOR(S) : Joseph M. Harris Page 1 of 1

It is certified that error appears in the above-identified patent and that said Letters Patent is hereby corrected as shown below:

ABSTRACT
Line 1, delete "fee block" and insert therefor -- feedblocks --.

Signed and Sealed this

Twenty-fifth Day of December, 2001

Attest:

Attesting Officer

JAMES E. ROGAN  
Director of the United States Patent and Trademark Office